March 1, 1938.  G. H. LE BOEUF  2,109,571
AUTOMOBILE BAGGAGE CARRIER
Filed June 8, 1936
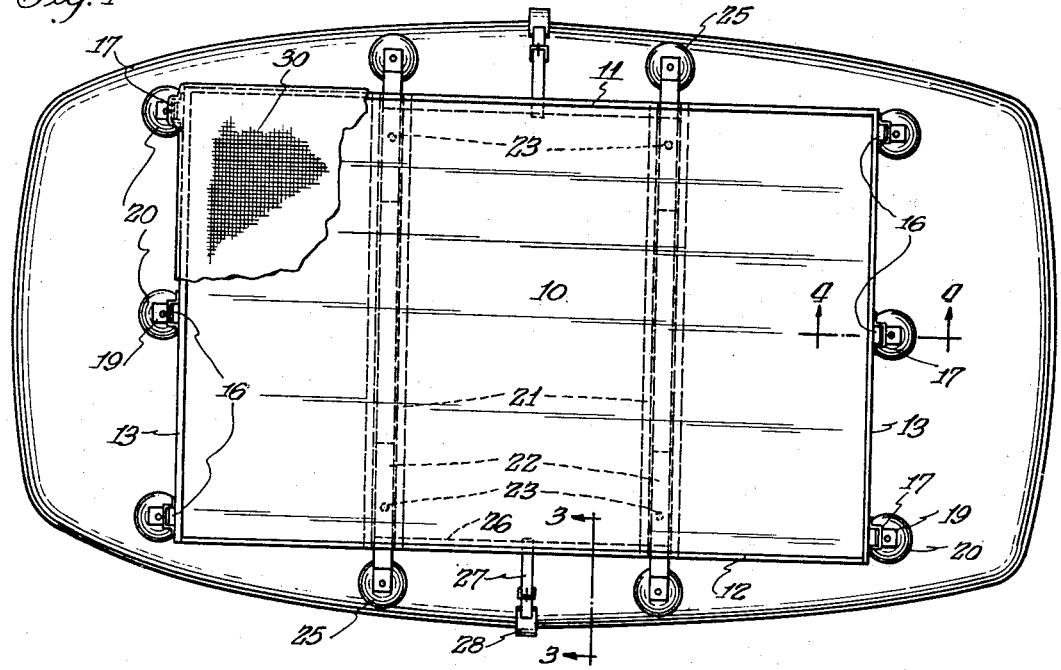
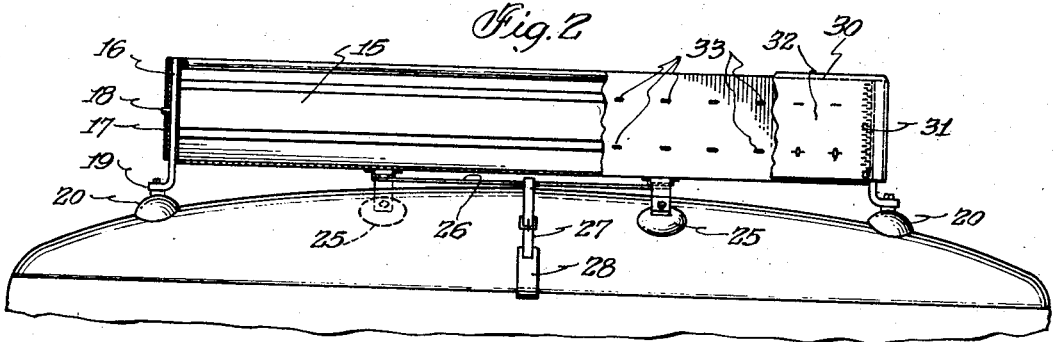
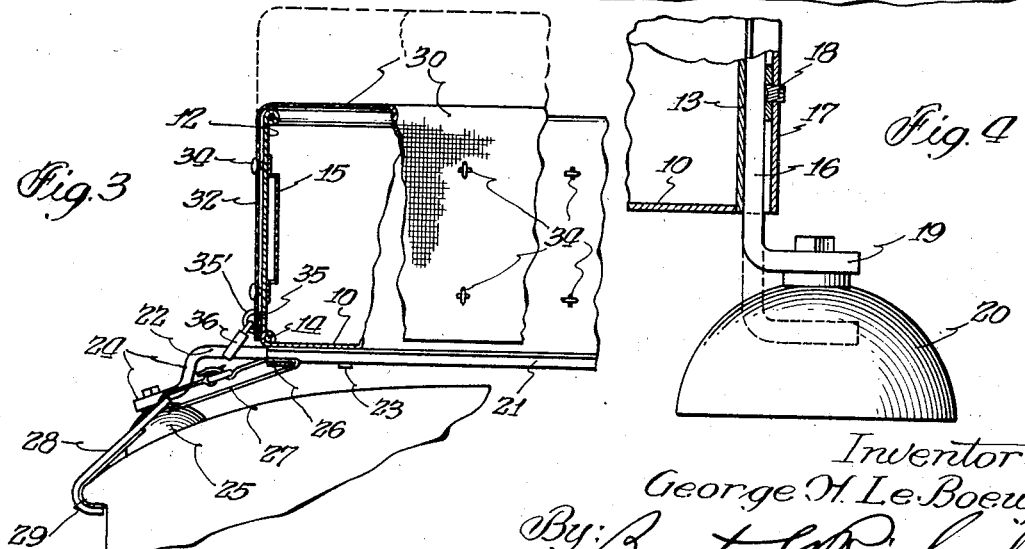
Inventor:
George H. Le Boeuf.
By: Brayton Richards
Attorney Patented Mar. 1, 1938

2,109,571

UNITED STATES PATENT OFFICE 2,109,571

AUTOMOBILE BAGGAGE CARRIER

George H. Le Boeuf, Manitowoc, Wis.

Application June 8, 1936, Serial No. 84,016

1 Claim. (Cl. 224—29)

The invention relates to improvements in automobile baggage carriers and has for its primary object the provision of an improved construction of the class indicated which is capable of economical production and highly efficient in use.

Another object of the invention is the provision of an improved construction of the character indicated provided with a protective covering so constructed and arranged as to give ready access thereto when in use.

Another object of the invention is the provision of an improved construction of the character indicated so constructed and arranged as to be readily adjustable to fit upon and secure to the top or roof of an ordinary automobile body.

Other objects will appear hereinafter.

The invention consists in the combinations and arrangements of parts hereinafter described and claimed.

The invention will be best understood by reference to the accompanying drawing forming a part of this specification and in which Fig. 1 is a top plan view, with portions removed, of an automobile baggage carrier embodying the invention;

Fig. 2 a side view of the same shown partially in section;

Fig. 3 an enlarged section taken substantially on line 3—3 of Fig. 1; and

Fig. 4 an enlarged section taken substantially on line 4—4 of Fig. 1.

The embodiment of the invention illustrated in the drawing comprises a baggage receptacle form of sheet metal and in the form of a shallow open top box having a bottom 10, sides 11 and 12, and ends 13. The side 12 is hinged at 14 for downward swinging thereof to give ready access to the interior of the receptacle when in use on the top of an ordinary automobile body as indicated, said side 12 being arranged on the side opposite the driver so as to facilitate ready removal of baggage when adjacent to curb. Each of the sides 11 and 12 is reinforced by a longitudinal strip 15 of reinforcing material secured thereto as shown.

At each end the baggage receptacle is provided with three vertically adjustable supporting legs 16 each mounted to slide vertically in a corresponding guide channel 17 and adjustably secured therein by means of a corresponding set screw 18. Each supporting leg 16 is provided at its lower end with an angularly turned foot 19 carrying a rubber vacuum cup contact member 20 adapted and arranged to fit upon and cling to the top of an ordinary automobile body as indicated. The independent adjustment thus afforded to the supporting legs 16 permits of ready adjustment of the same to the contour of any automobile body top, as will be readily understood.

The baggage receptacle is provided on its bottom with two transverse guide and reinforcing channels 21 extending entirely across the same and open at their ends to adjustably receive supporting brackets 22 which are adjustably secured therein by means of set screws 23. Each of the supporting brackets 22 is provided at its outer end with a downwardly and outwardly projecting supporting foot 24 carrying a rubber vacuum cup contact member 25 adapted and arranged to rest upon and cling to the top of the automobile. By this arrangement the bottom of the receptacle is suitably reinforced and supporting brackets provided which may be readily adjusted to fit the contour of the automobile top, as will be readily understood.

Attaching bars 26 are secured across the ends of the channels 21 and attaching straps 27 are looped around said attaching bars and through openings in attaching brackets 28 having hooked ends adapted and arranged to hook under the usual ledges 29 at the sides of the top of an ordinary automobile and serve as means for drawing the vacuum cups 20 and 25 into close intimate clinging relation to the top of the automobile and whereby the baggage receptacle will be properly secured and held in place without scarring or marring the top of the automobile in any way.

A cover 30, preferably formed of waterproof canvas or other similar flexible material, is arranged to fit over and around the baggage receptacle. Slide fastenings 31, commonly known as "Zipper" fastenings, are provided at each end of the side 32 of the cover 30 corresponding with the downwardly swinging side 12 of the baggage receptacle and whereby the side 32 may be readily converted into an upwardly swinging flap giving access to the interior of the baggage receptacle, as will be readily understood. The sides and ends of the cover 30 are provided with reinforced oblong openings 33 adapted and arranged to fit over oblong rotatable buttonheads 34 for securing said cover member in place on the baggage receptacle, as will be readily understood. A reinforcing bar 35 is arranged along the lower edge of the cover flap 32 and a staple 35' on the receptacle side 12 is arranged to protrude through said bar and receive the padlock 36 whereby said cover member may be locked in place on the baggage receptacle.

In this way an improved automobile baggage carrier is provided which is light in weight; may be readily attached to the top of any ordinary automobile body; will not scar or injure the automobile top; which will protect the contained baggage or luggage from the weather; and give ready access thereto when desired. The specific form and arrangement of parts is a simple and effective one for the purpose.

While I have illustrated and described the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claim.

I claim:

A construction of the class described comprising a baggage receptacle; contact members at each end of said receptacle adapted and arranged to contact with the top of an automobile; a plurality of transverse channels arranged on the bottom of said receptacle; supporting brackets laterally adjustable in said channels and projecting laterally and downwardly therefrom and provided at their projecting ends with contact members adapted and arranged to contact with the top of an automobile; attaching bars connected across said channels at each side of said receptacle; and brackets having hooked ends adapted and arranged to hook under the ledges at the sides of the top of an automobile and adjustably connected with said attaching bars.

GEORGE H. LE BOEUF.